United States Patent

Hamamura et al.

[11] Patent Number: 5,150,639
[45] Date of Patent: Sep. 29, 1992

[54] METHOD OF CUTTING THIN FILM OUT AND DEVICE FOR PRACTICING SAME

[75] Inventors: Fumio Hamamura, Kanagawa; Katsuyoshi Watanabe, Yamaguchi, both of Japan

[73] Assignees: Somar Corporation; Hitachi Techno Engineering Co., Ltd., both of Tokyo, Japan

[21] Appl. No.: 772,301

[22] Filed: Oct. 7, 1991

[30] Foreign Application Priority Data

Dec. 20, 1990 [JP] Japan ................................ 2-404310

[51] Int. Cl.⁵ .............................................. B26D 1/45
[52] U.S. Cl. .......................................... 83/39; 83/555; 83/914; 83/940; 156/267
[58] Field of Search ................... 83/28, 914, 39, 922, 83/940, 555, 556, 578, 648, 39; 156/267

[56] References Cited

U.S. PATENT DOCUMENTS

| | | | |
|---|---|---|---|
| 4,373,412 | 2/1983 | Gerber et al. | 83/28 X |
| 4,641,556 | 2/1987 | Vigheron et al. | 83/39 X |
| 4,704,927 | 11/1987 | Hirosawa | 83/39 X |
| 4,894,102 | 1/1990 | Halls et al. | 156/267 X |
| 5,074,178 | 12/1991 | Shetley et al. | 83/39 X |
| 5,078,820 | 1/1992 | Hamamura et al. | 156/267 |

Primary Examiner—Douglas D. Watts
Assistant Examiner—Kenneth E. Peterson
Attorney, Agent, or Firm—Sughrue, Mion, Zinn, Macpeak & Seas

[57] ABSTRACT

A method in which a thin continuous film for conveying a base plate put on the film and another thin continuous film stuck to the main surface of the plate are automatically cut out along the contour of the plate, wherein a cutter is moved to one end of each edge of the plate from an optional position distant from the edge and is thereafter moved to the other end of the edge from another optional position distant from the edge, and movement of the cutter is performed with regard to all the edges of the plate sequentially.

9 Claims, 10 Drawing Sheets

METHOD OF CUTTING THIN FILM OUT AND DEVICE FOR PRACTICING SAME

BACKGROUND OF THE INVENTION

The present invention relates to an art of cutting out a thin film stuck to a base plate, and more particularly relates to an art in which a continuous dry film which consists of a light-transmissible resin film and a layer made of a photosensitive resin such as a photo resist and provided on one side of the resin film and is stuck to the main surface of an electronic circuit base plate such as a liquid crystal display electrode plate and a printed circuit base plate is automatically cut out along the contour of the base plate.

There is a dry film sticking apparatus for sticking a thin continuous dry film to the main surface of a base plate by a prescribed temperature and prescribed pressure. The sticking apparatus comprises a base plate loader by which a plurality of base plates put in a cassette are placed on a conveyance film which is a continuous polyester film, a film feeder for supplying the conveyance film and the dry film, a pressure sticking vacuum chamber unit by which the continuous dry film is stuck, at the prescribed temperature under the prescribed pressure, to the main surface of the base plate on the conveyance film in a vacuum or an atmosphere of reduced pressure to seal the base plate with the dry film and the conveyance film as vacuum packing, to produce a stratified body of the base plate and both the films, a heating and pressure sticking roller unit by which the dry film stuck to the main surface of the base plate by the pressure sticking vacuum chamber unit is heated and further stuck to the main surface, under pressure, a film pull-out unit for moving the conveyance film and the dry film to each step of processing by the apparatus, a film cutoff unit for cutting off the dry film and the conveyance film at every prescribed interval for each stratified body, and a put-in unloader by which the stratified body consisting of the base plate, the dry film on the upper side of the plate and the conveyance film on the lower side of the plate is put in a cassette, as described in the Japan Patent Application (OPI) No. 244465/89 (the term "OPI" as used herein means an "unexamined published application"). After the stratified body is put out from the dry film sticking apparatus, the dry film and conveyance film of the stratified body are manually cut out along the contour of the base plate.

Since the dry film and conveyance film of the stratified body produced by the dry film sticking apparatus described above are manually cut out along the contour of the base plate, the efficiency of the cutting-out is low, namely, the productivity for the stratified body having the dry film and the conveyance film cut out is low. This is a problem.

SUMMARY OF THE INVENTION

The present invention was made in order to solve the problem. Accordingly, it is an object of the present invention to provide an art in which a conveyance film, which is a continuous film, and a continuous dry film stuck to the main surface of a base plate put on the conveyance film are automatically cut out along the contour of the base plate.

The above-mentioned and other objects and novel features of the present invention will be apparent from the description herein and the drawings attached hereto.

The typical aspects of the present invention are briefly described from now on. It is the most major feature of the present invention that a cutter is initially set in a position between both the ends of and offset from one edge of a base plate put on a thin continuous film for the conveyance of the plate and stuck with another thin continuous film on the main surface of the plate, and is moved from the position to the edge of the plate so as to come into contact with the edge, and then moved along the edge; the initial setting and movement of the cutter are performed with regard to all the edges of the base plate sequentially; and the cutter is thereafter subjected to similar initial setting and movement with regard to all the edges sequentially in directions reverse to those of the former movement, thus automatically cutting out both the thin films along the contour of the base plate. It is a major feature of the present invention that a cut-out table on which the base plate put on the thin continuous film for the conveyance of the base plate and stuck with the other thin continuous film is removably put, a means for initially setting the cutter in the position off both the ends of one edge of the base plate, moving the cutter from the position to the edge to put the cutter into contact therewith, and moving the cutter along the edge, a means for performing the movement of the cutter along all the edges of the base plate sequentially, and a means for moving the cutter along all the edges in the directions reverse to those of the former movement of the cutter are provided.

Because of the above-mentioned features of the present invention, the thin continuous film for the conveyance of the base plate put on the film, and the other thin continuous film stuck to the main surface of the base plate can be automatically and efficiently cut out along the contour of the base plate so that the productivity for the assembly of the base plate and the films is made high.

DETAILED DESCRIPTION OF THE PREFERRED EMBODIMENTS

Embodiments of the present invention are hereafter described with reference to the drawings attached hereto. Mutually equivalent portions shown in the drawings are denoted by the same reference symbols, and not repeatedly described in detail.

Figure 11:
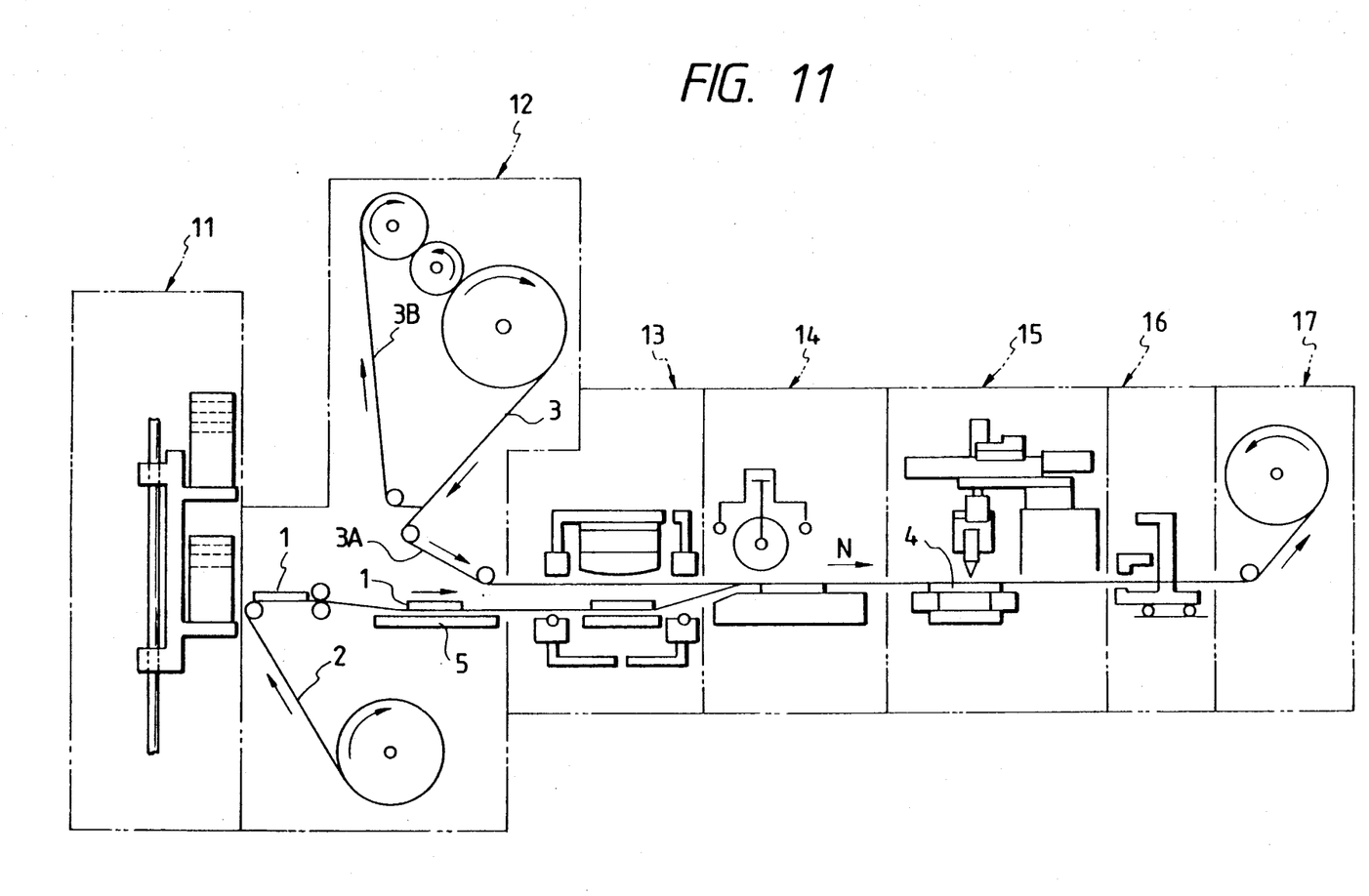
FIG. 11 a schematic view of a dry film sticking apparatus including the device.

In FIG. 11, a dry film sticking apparatus which includes the film cutout device according to the invention is used to stick the thin dry film 3A to the main surface of the base plate 1 put on the conveyance film 2 which is a thin continuous film.

Figure 1:
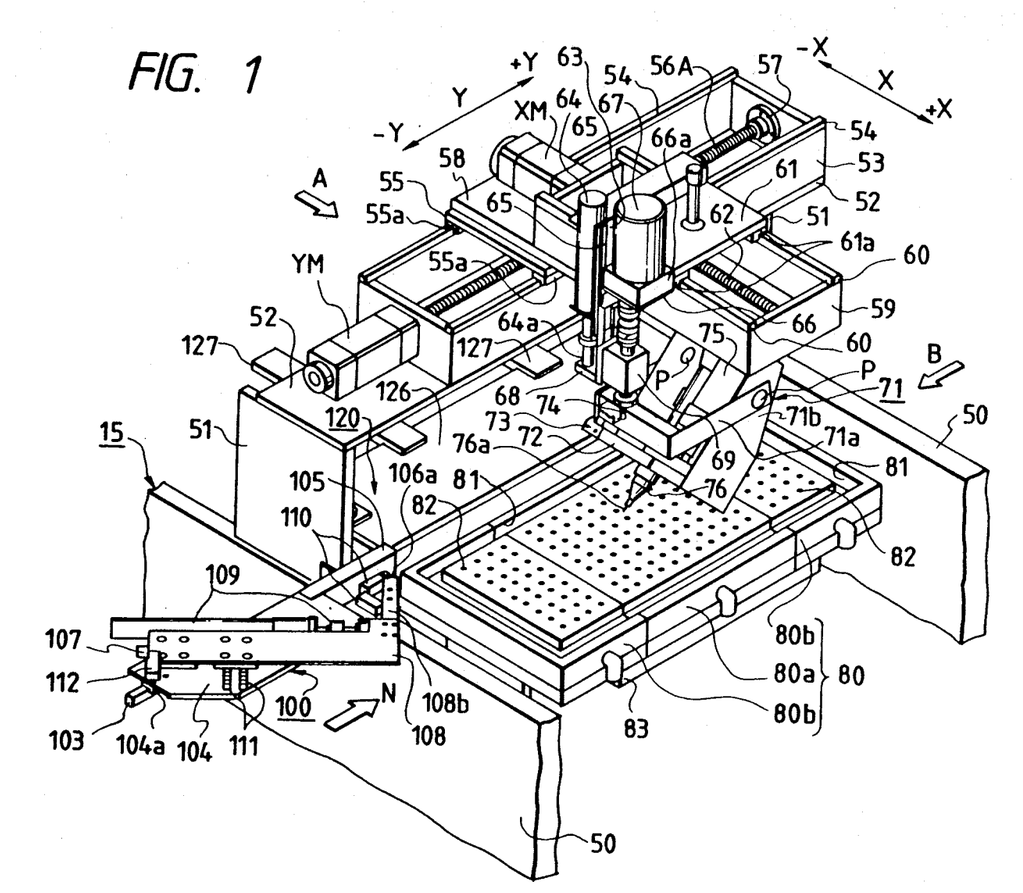
FIG. 1 is a perspective view of a film cut-out device which is an embodiment of the present invention.

The film sticking apparatus comprises a base plate load 11 by which a plurality of base plates 1 contained in a cassette are put one after another onto the conveyance film 2, a film feeder 12 which supplies the dry film 3A and the conveyance film 2 as a stratified film 3 consisting of three layers which are a light-transmissible resin film, a photosensitive resin layer and a cover film 3B is divided into the cover film 3B and the dry film 3A, a sticking vacuum chamber unit 13 by which the dry film 3A is stuck, under pressure, to the main surface of the base plate 1 on the conveyance film 2 in a vacuum or an atmosphere of reduced pressure to seal the base plate with the dry film 3A and the conveyance film 2 as vacuum packing, to make a stratified body 4 of the base plate 1 and both the films 2 and 3A, a heating and pressure sticking unit 14 by which the dry film 3A stuck, under pressure, to the main surface of the base plate 1 is heated and further stuck thereto under pressure, the film cut-out device 15 which cuts out the conveyance film 2 and the dry film 3A along the contour of the base plate 1 of the stratified body 4, a film pull-out unit 16 for moving the conveyance film 2 and the dry film 3A in a direction N shown in FIGS. 1 and 11, and a film winder 17 which winds the conveyance film 2 and the dry film 3A from which the stratified body 4 is cut out by the device 15.

Figure 2:
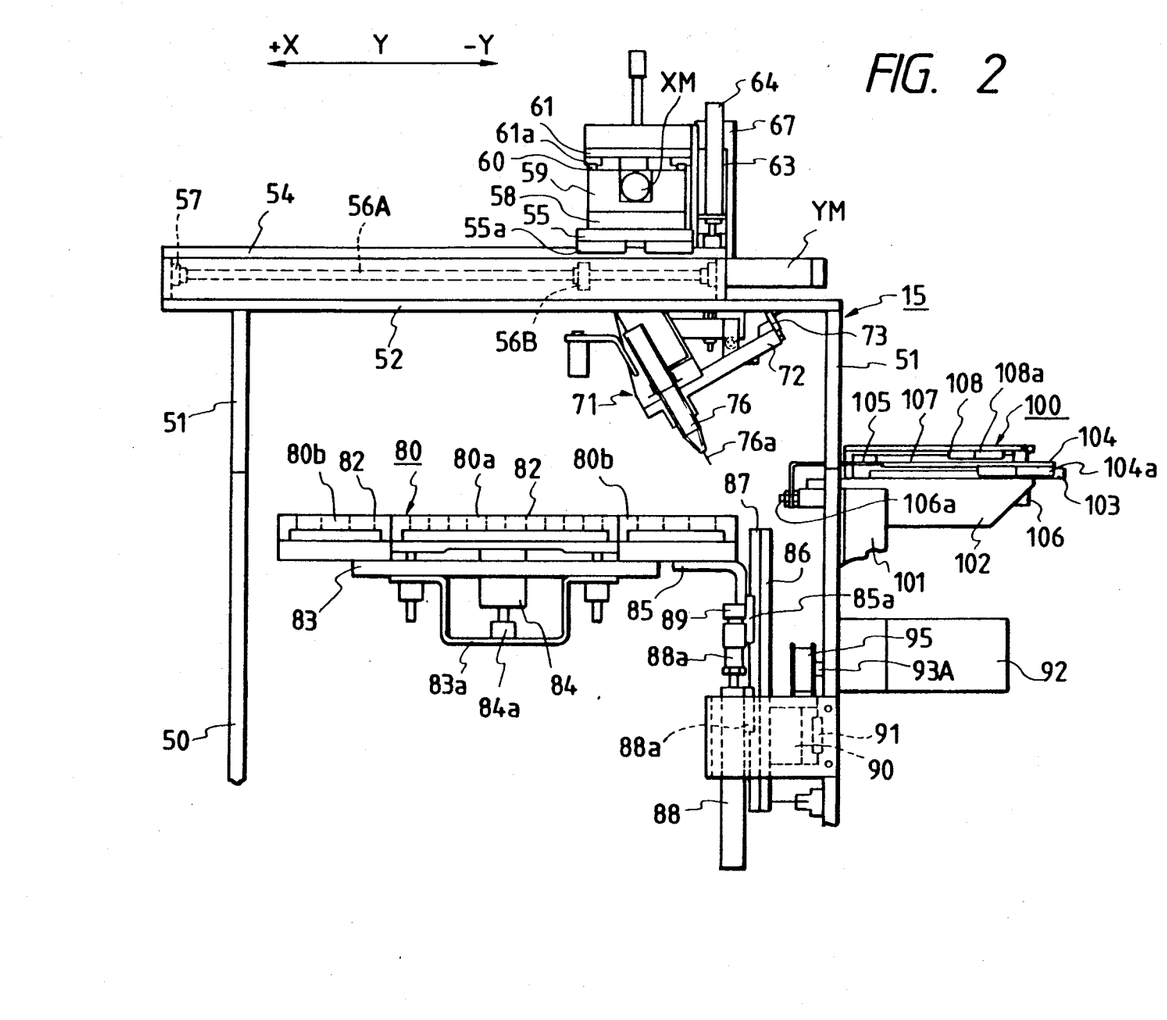
FIG. 2 is a side view of a major part of the device seen along an arrow A shown in FIG. 1.
Figure 3:
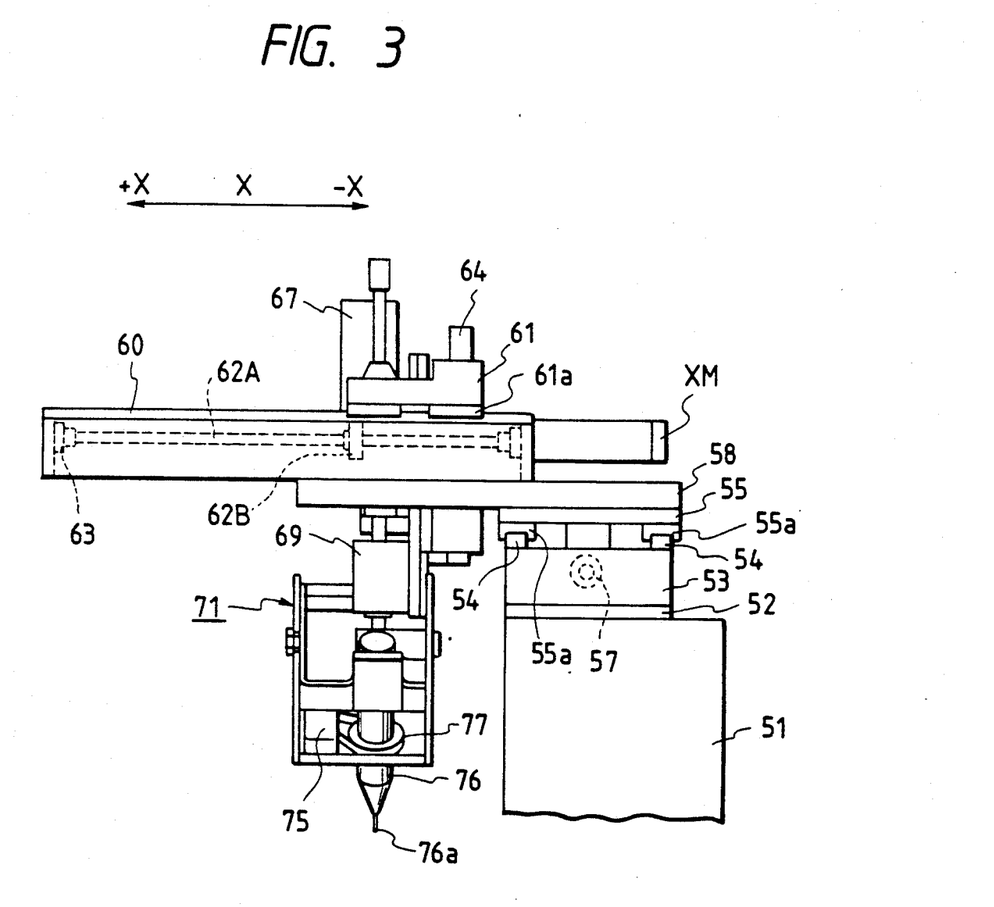
FIG. 3 is a rear view of a major part of the device seen along an arrow B shown in FIG. 1.

The film cut-out device 15 provided as a unit of the dry film sticking apparatus is described in detail with reference to the drawings from now on. As shown in FIGS. 1, 2 and 3, and device 15 includes a moving mechanism mounting plate 52 supported with side plates 51 on the body frame 50 of the device, rail support members 53 which are oblong plates and secured to the main surface of the moving mechanism mounting plate 52, slide rails 54 secured to the mutually-parallel longer edge of the rail support members 53, a slide plate 55 secured to slide members 55a slidably fitted on the slide rails 54, and an actuator YM which is a drive motor secured to the mutually-parallel shorter edges of the rail support members 53.

The rotary shaft 56A of the moving screw means of the device 15 is secured at one end of the shaft to the drive shaft of the actuator YM, and rotatably supported at the other end with a bearing member 57 secured to the other mutually-parallel shorter edges of the rail support members 53. The nut 56B of the moving screw means is engaged with the rotary shaft 56A and secured to the bottom of the slide plate 55 so that when the rotary shaft 56A is rotated by the actuator YM, the slide plate 55 is moved through the moving screw means while being guided by the slide rails 54. If the actuator YM is rotated forward, the slide plate 55 is moved in a direction +Y along a y-axis. If the actuator YM is rotated backward, the slide plate 55 is moved in another direction −Y along the y-axis.

Another moving mechanism mounting plate 58 is secured to the main surface of the slide plate 55. Other rail support members 59, which are oblong plates similarly to the former rail support members 53, are secured to the main surface of the slide plate 55. Other slide rails 60 are secured to the mutually-parallel longer edges of the rail support members 59. Another slide plate 61 is secured to slide members 61a slidably fitted on the slide rails 60. Another actuator XM, which is a drive motor, is secured to the mutually-parallel shorter edges of the rail support members 59. The rotary shaft 62A of another moving screw means is secured at one end of the shaft 62A to the drive shaft of the actuator XM and rotatably supported at the other end of the shaft 62A with a bearing member 63 secured to the other mutually-parallel shorter edges of the rail support members 59. The nut 62B of the moving screw means is engaged with the rotary shaft 62A and secured to the bottom of the slide plate 61 so that when the rotary shaft 62A is rotated by the actuator XM, the slide plate 61 is moved through the moving screw means while being guided by the slide rails 60. If the actuator XM is rotated forward, the slide plate 61 is moved in a direction +X along an x-axis. If the actuator XM is rotated backward, the slide plate 61 is moved in a direction −X along the x-axis.

A moving mechanism for positioning the cutoff unit 71 of the film cut-out device 15 along the x-axis and the y-axis is thus constituted on the body frame 50 of the device.

A pneumatic cylinder support plate 63 is secured to the slide plate 61 at the side edge thereof. The body of a pneumatic cylinder 64 is secured to the support plate 63. Slide rails 65 are secured to the support plate 63 opposite the cylinder 64. An actuator support plate 66 shaped as L is slidable fitted on the slide rails 65. An actuator 67, which is a drive motor for turning the cutoff unit 71, is secured with a securing member 66a to the actuator support plate 66. A bearing member support plate 68 shaped as L is slidably fitted on the slide rails 65. A bearing member 69 is secured to the support plate 68 on the vertical portion thereof, and supports a cutoff unit rotation shaft 70 shown in FIG. 7. The piston rod 64a of the pneumatic cylinder 64 is secured at the tip of the rod to the support plate 68 at one end thereof. The rotation shaft 70 is secured at one end thereof to the drive shaft of the actuator 67, and rotatably supported at the other end by the bearing provided in the bearing member 69 but not shown in the drawings. The actuator support plate 66 is coupled to the bearing member support plate 68 by the rotation shaft 70 so that the actuator support plate 66 is slid on the slide rails 65 when the bearing member support plate 68 is slid on the slide rails 65 by the pneumatic cylinder 64. The rotation shaft 70 is coupled at the other end to the cutoff unit 71.

Figure 9:
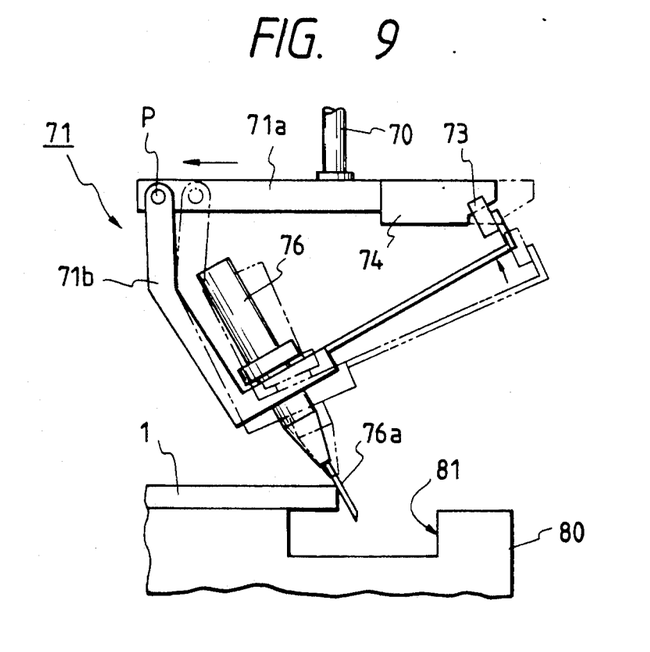
FIG. 9 is a view of the cutoff unit of the device to illustrate the operation of the unit.

The cutoff unit 71 includes a bracket 71a secured to the cutoff unit rotation shaft 70, and another bracket 71b supported by the former bracket at a fulcrum P. A sensor support member 72 is secured to the bracket 71b at one side thereof, and supports an angle sensor 73 at the tip of the support member 72. A member 74 for the operation of the angle sensor 73 is provided on the bracket 71a at one side thereof. An actuator 75, which is a drive motor for turning a cutter holder 76, is secured to the bracket 71b inside it. The bracket 71b has a through hole in one side of the bracket. The cutter holder 76 is supported with a bearing in the through hole so that the holder can be turned with a belt 77 by the torque of the actuator 75. A cutter 76a for cutting out the films 2 and 3A along the contour of the base plate 1 is supported by the holder 76 at the tip thereof. The bearing member support plate 68 can be slid on the slide rails 65 by the pneumatic cylinder 64 so as to vertically move the cutoff until 71 up and down. Besides, the cutoff unit 71 can be moved in optional directions along the x-axis and the y-axis by the moving mechanism mentioned above.

Figure 7:
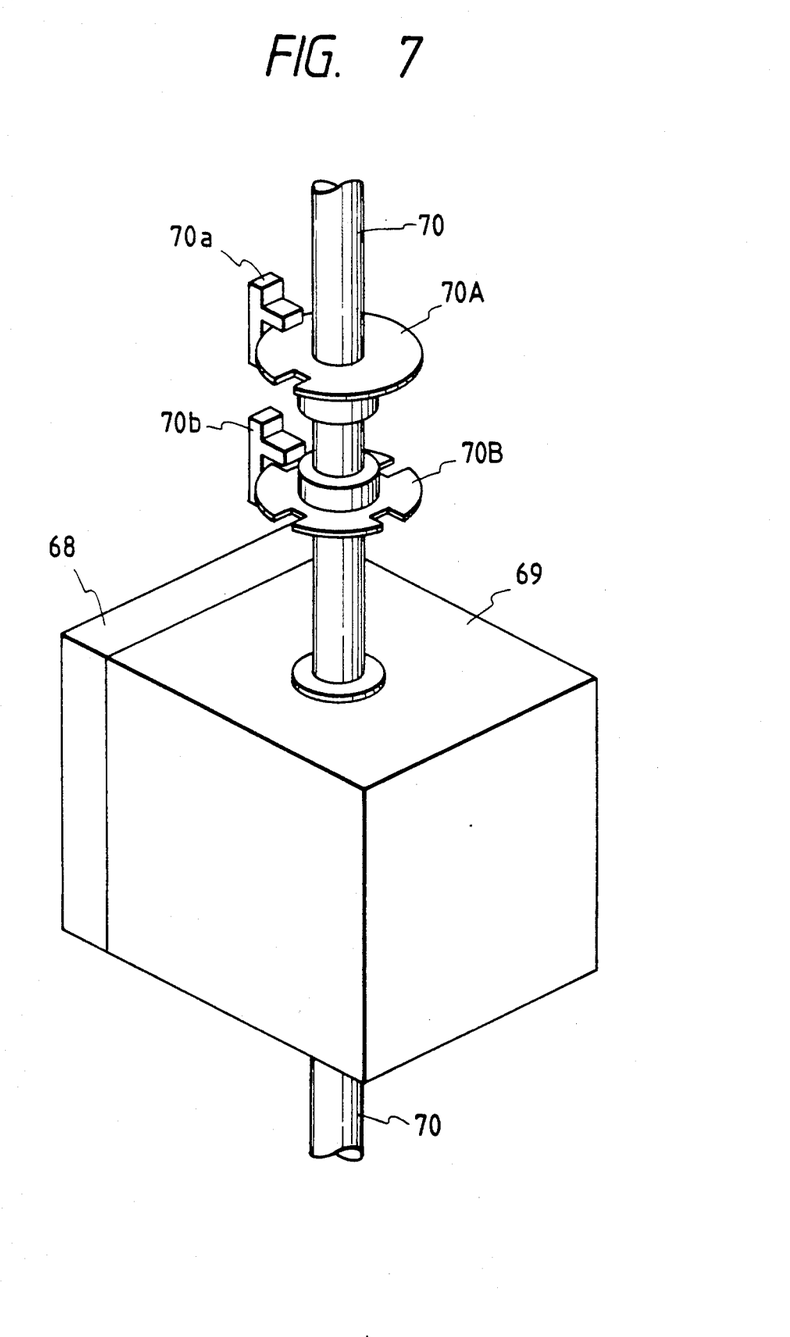
FIG. 7 is a perspective enlarged view of a major part of the cutoff unit rotation shaft section of the device.

Encoders 70A and 70B are provided on the central portion of the cutoff unit rotation shaft 70, as shown in FIG. 7. The encoder 70A has a notch. A sensor 70a is provided at the encoder 70A in order to detect the position of the cutoff unit 71 rotated by an angle of 180 degrees. The encoder 70B has four notches at equal intervals. A sensor 70b is provided at the encoder 70B in order to detect the position of the cutoff unit 71 rotated by an angle of 90 degrees.

Figure 4:
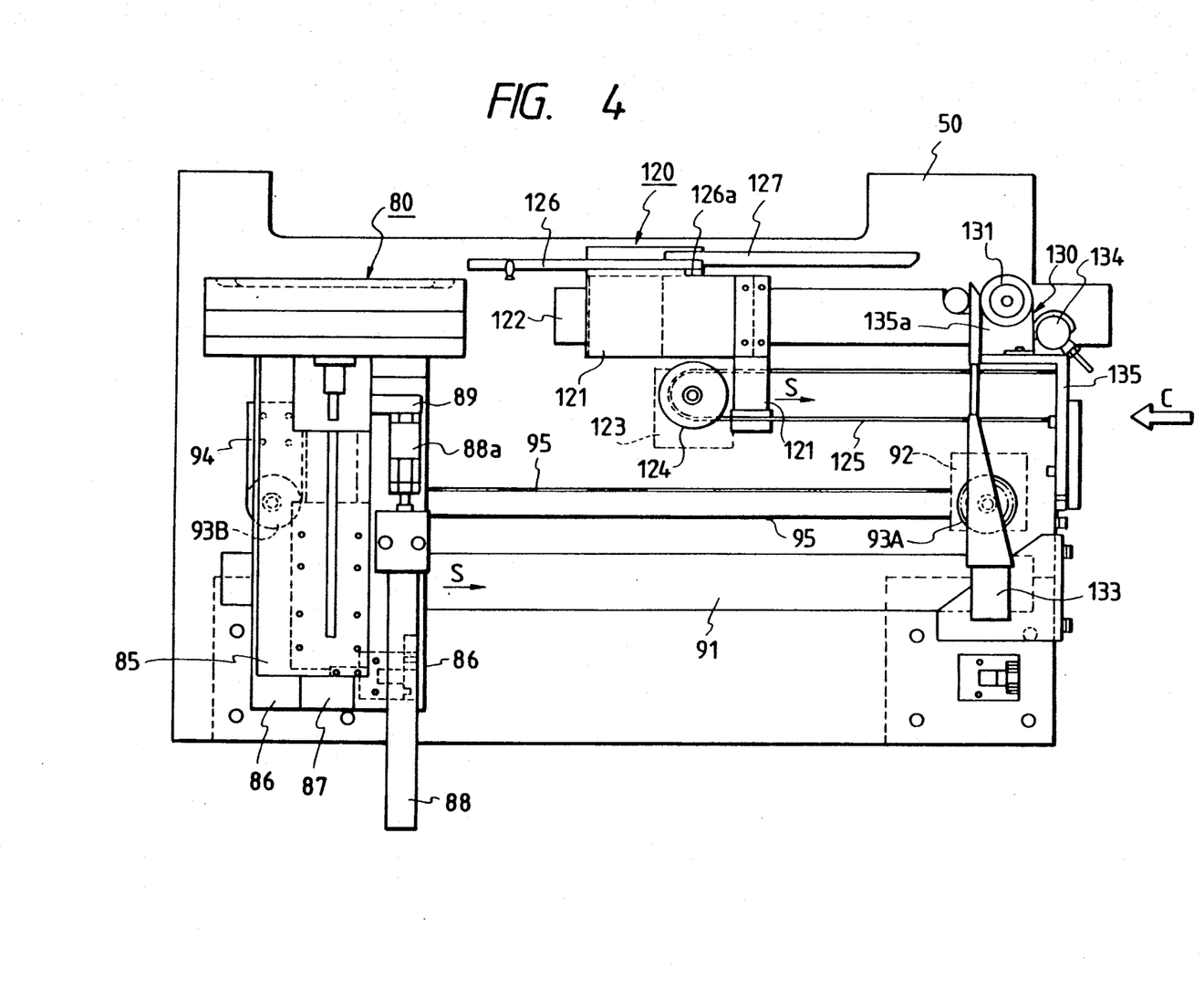
FIG. 4 is a rear view of a major part of the device seen along the arrow B.

As shown in FIGS. 1, 2 and 4, the film cut-out device 15 has a cut-out table 80 inside the body frame 50 so that the stratified body 4 conveyed to the device as shown in FIG. 11 is removably put on the table. The table 80 is a three-split table, and includes a main portion 80a and two auxiliary portions 80b located at the front and rear edges of the main portion 80a. The main surface of the table 80 has a cut-out groove 81 having a form corresponding to the contour of the stratified body 4, and has a plurality of suction holes 82 for sucking the stratified body 4 on the main surface. The auxiliary portions 90b are secured to a securing support plate 83 whose central portion has a through hole through which a pneumatic cylinder 84 secured to the bottom of the main portion 80a extends. The piston rod 84a of the cylinder 84 is secured to a bracket 83a supported by the plate 83 at the bottom thereof. The main portion 80a is thus supported with the plate 83 and the cylinder 84 so that the main portion can be moved up and down by the cylinder. A vertically moving plate 85 shaped as L is secured to the bottom of one of the auxiliary portions 80b so that the cut-out table 80 is supported with the plate. The vertically moving plate 85 is secured to a slide member 85a slidably fitted on a slide rail 87 secured to a cut-out table moving plate 85. A pneumatic cylinder 88 is secured to the table moving plate 85. The tip of the piston rod 88a of the cylinder 88 is secured with a securing member 89 to the vertically moving plate 85 so that the plate 85 can be moved up and down by the cylinder 88 while being guided by the slide rail 87. For that reason, the cut-out table 80 can be moved up and down by the cylinder 88. A slide member 90 is secured to the cut-out table moving plate 86 opposite the cylinder 88 so that the plate can be slid while being guided by a slide rail 91 secured to the body frame 50 of the film cut-out device 15.

An actuator 92, which is a drive motor for moving the cut-out table 80, is provided on the body frame 50. A pulley 93A is provided on the drive shaft of the actuator 92. The body frame 50 is fitted with a bearing member 94 to which a shaft by which a pulley 93B shown in FIG. 4 is rotatably supported is secured. A rotary belt 95 is wound on the pulleys 93A and 93B and secured in part to the cut-out table moving plate 86 so that the plate can be moved with the belt, in a direction S shown in FIG. 4, on the slide rail 92 by the torque of the actuator 92. The cut-out table 90 can thus be moved in the direction S by the actuator 92.

Figure 5:
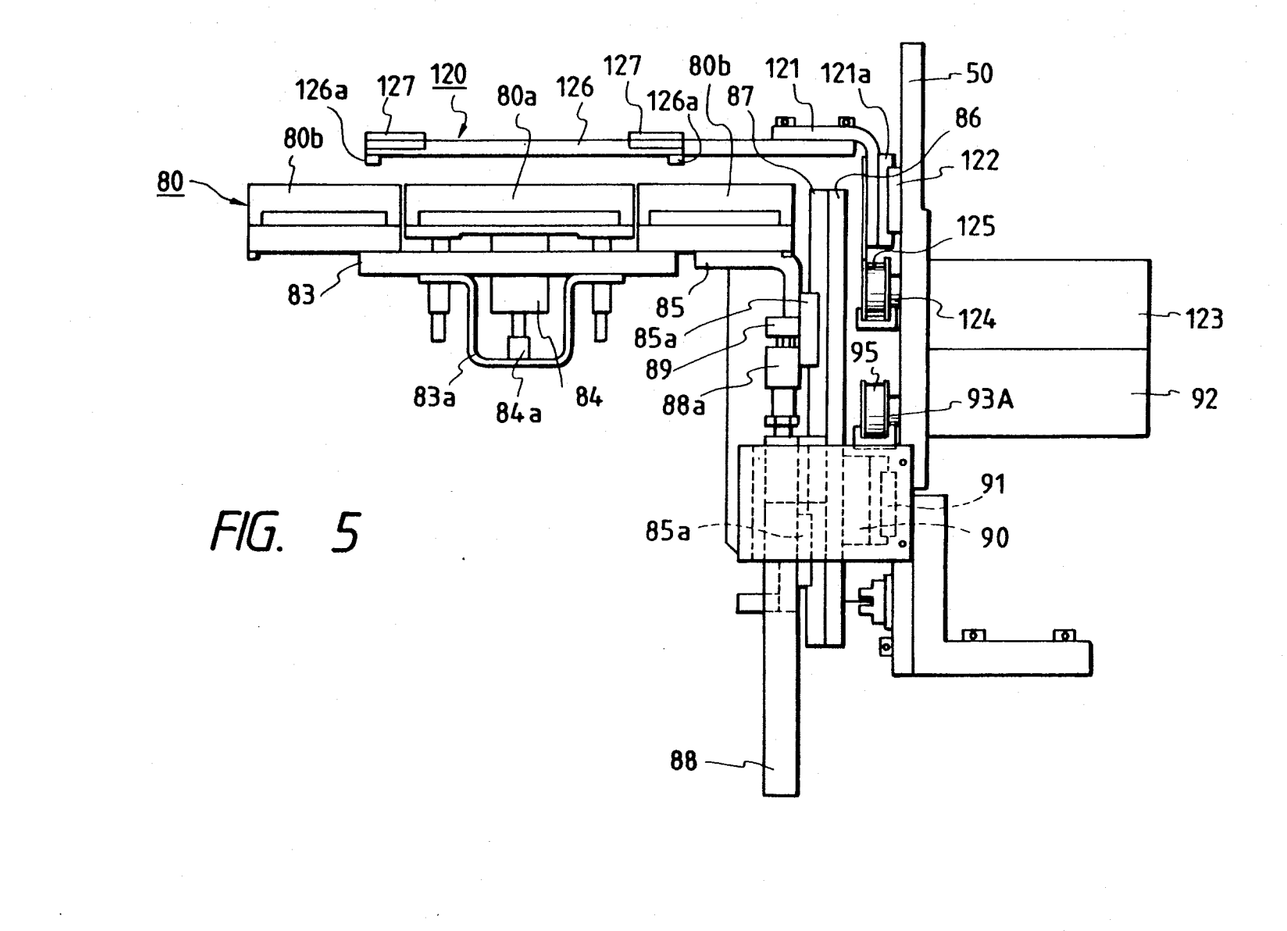
FIG. 5 is a side view of a major part of the device seen along an arrow C shown in FIG. 4, in the state that the device is removed of a dust collector.

As shown in FIGS. 1, 4 and 5, a pusher 120 is provided so that it extends along the direction S of the movement of the cut-out table moving plate 86. The pusher 120 is supported with a pusher moving plate 121 secured to a slide member 121a, which can be slid while being guided by a slide rail 122 secured to the body frame 50. The frame 50 is fitted with an actuator 123 which is a drive motor for moving the pusher 120. A pulley 124 is secured to the drive shaft of the actuator 123. A rotary belt 125 is wound on the pulley 124 and secured in part to the pusher moving plate 121 so that the plate 121 can be moved with the belt 125, in the direction S, on the slide rail 122 by the torque of the actuator 123. The pusher 120 can thus be moved in the direction S by the actuator 123. The pusher 120 includes a conveyance film recovery plate 126 secured to the pusher moving plate 121, and a base plate hold-down plate 127 secured to the recovery plate. The conveyance film recovery plate 126 is provided with a suction mechanism which is not shown in the drawings and is for sucking the conveyance film 2 on the plate 126. A jut 126a for pushing out the base plate 1 is provided on the recovery plate 126 at the end thereof.

Figure 6:
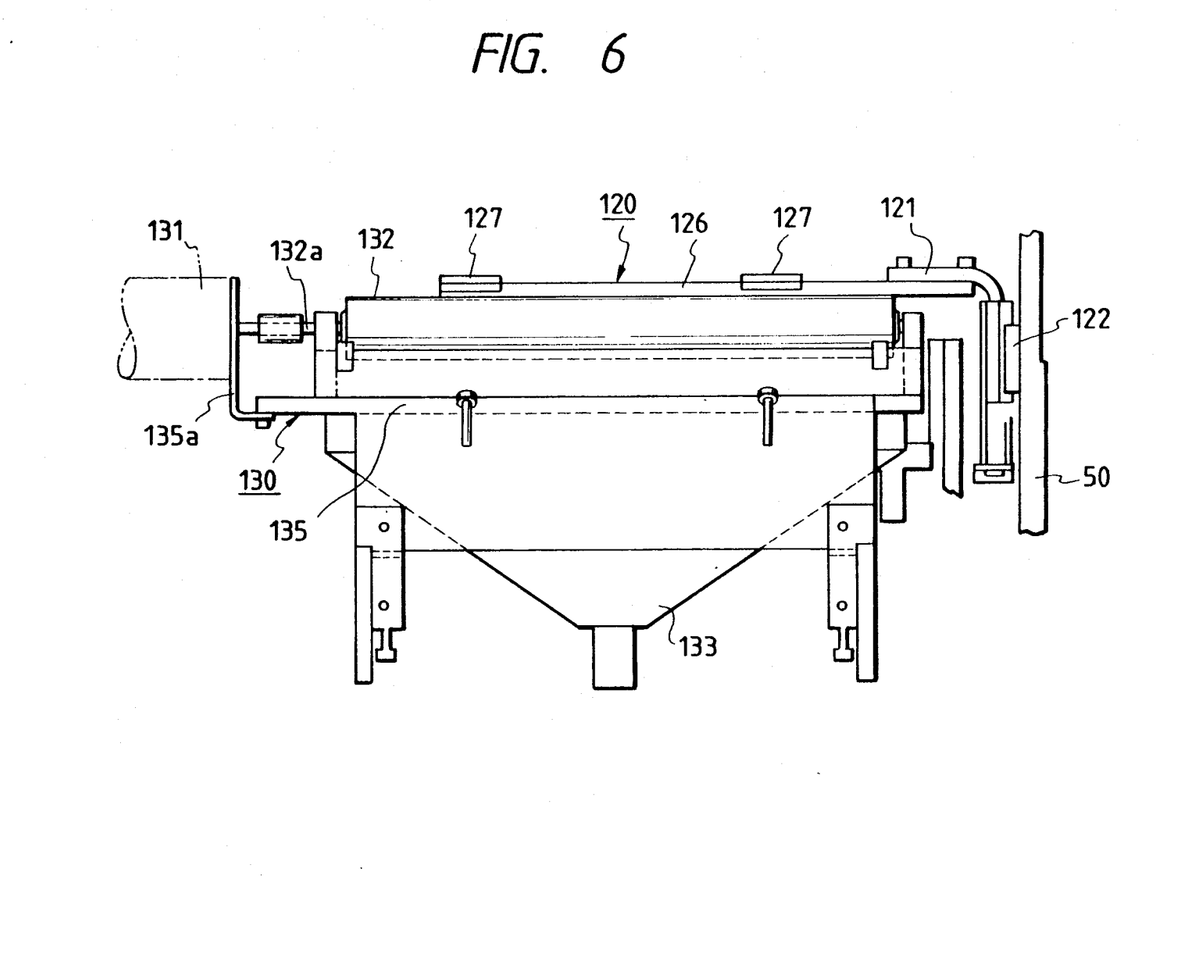
FIG. 6 is a side view of a major part of the dust collector seen along the arrow C.

The dust collector 130 for removing dust, a chip or the like from the bottom of the base plate 1 pushed out by the pusher 120 is provided so that the collector 130 extends along the direction S of the movement of the pusher 120, as shown in FIGS. 4 and 6. The dust collector 130 includes a brush roller 132, which is rotated by a drive motor 131, a suction duct 133 for sucking the dust, the chip or the like, and a static electricity elimination bar 134 for removing static electricity. The brush roller 132 is supported by a support frame 135 secured to the body frame 50. The motor 131 is supported with a bracket 135a by the support frame 135. The drive shaft of the motor 131 is secured to the rotary shaft 132a of the brush roller 132. The static electricity elimination bar 134 and the suction duct 133 are supported by the frame 135.

Figure 8:
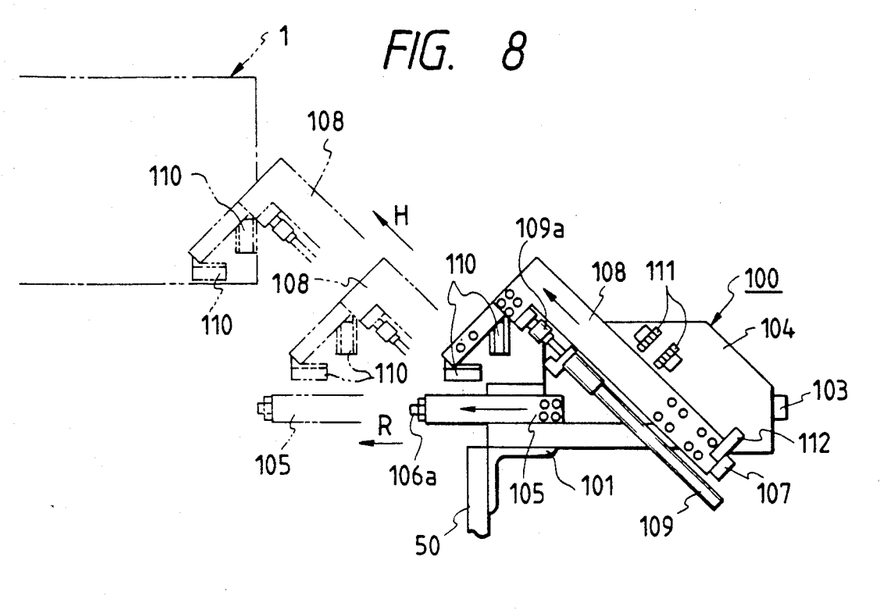
FIG. 8 is a view of the position sensor unit of the device to illustrate the operation of the unit.

As shown in FIGS. 1, 2 and 8, the film cut-out device 15 has a position sensor unit 100 at the side of the body frame 50, to which the stratified body 4 shown in FIG. 11 is conveyed. The position sensor unit 100 is supported with a unit support frame 101 by the body frame 50. A unit support member 102 is secured to the unit support frame 101. A slide rail 103 is secured to the main surface of the unit support member 102. The support member 102 is coupled with a unit support plate 104 to which a slide member 104a, which is slid on the slide rail 103, is secured. A bracket 105 is secured at one end thereof to the unit support plate 104 at one end thereof. The tip of the piston rod 106a of a pneumatic cylinder 106 secured to the unit support member 102 is secured to the bracket 105 at the other end thereof. A slide rail 107 is secured to the main surface of the unit support plate 104 so that the rail 107 extends at a prescribed angle to the former slide rail 103. The unit support plate 104 is coupled with a sensor securing plate 108 to which a slide member 108a, which is slid on the slide rail 107, is secured. The tip of the piston rod 109a of a pneumatic cylinder 109 secured to the unit support plate 104 is secured to the sensor securing plate 108 at one end thereof. The main surface of the unit support plate 104 is fitted with two position sensors 111 at a predetermined interval corresponding to the width of the cut-out groove 81 of the cut-out table 80. A bracket 108b is secured to the sensor securing member 108 at one end thereof, and fitted with two base plate edge sensors 110 so that the sensors 110 extend rectangularly to each other. The sensor securing plate 108 is fitted with a cut-out groove width detection member 112 at the other end of the plate.

The operation of the film cut-out device 15 is described in detail from now on. The stratified body 4, which includes the dry film 3A heated and stuck to the main surface of the base plate 1 under pressure by the heating and pressure sticking unit 14 installed upstream of the film cut-out device 15 in the direction of the conveyance of the stratified body 4, is put on the cut-out table 80 of the device by the film pull-out unit 16, as shown in FIG. 11. At that time, the base plate 1 on a feed table 5 is conveyed to the sticking vacuum chamber unit 13, and the stratified body 4 produced by the unit is conveyed to the heating and pressure sticking unit 14. The stratified body 4 put on the cut-out table 80 is sucked in a prescribed position thereon by vacuum suction through the suction holes 82. It is judged by the position sensor unit 100 whether the base plate 1 of the stratified body 4 is sucked in the prescribed position on the cut-out table 80. For the judgement, the unit support plate 104 is moved in a direction R by the pneumatic cylinder 106, and the sensor securing member 108 is thereafter moved in a direction H by the pneumatic cylinder 109 so that the two base plate edge sensors 110 are placed at the edges of the base plate 1, as shown in FIG. 8. At that time, the position sensor unit 100 judges the base plate 1 to be sucked in the prescribed position on the cut-out table 80, if the cut-out groove width detection member 112 secured to the sensor securing member 108 at the end thereof is located between the two position sensors 111 placed in advance to correspond to the width of the cut-out groove 81 and the base plate edge sensors 110 detect the two rectangular meeting facets of the base plate 1. After it is thus judged by the position sensor unit 100 that the base plate 1 is sucked in the prescribed position on the table 80, the unit 100 is returned to the original position thereof and a next step is taken.

Figure 10A:
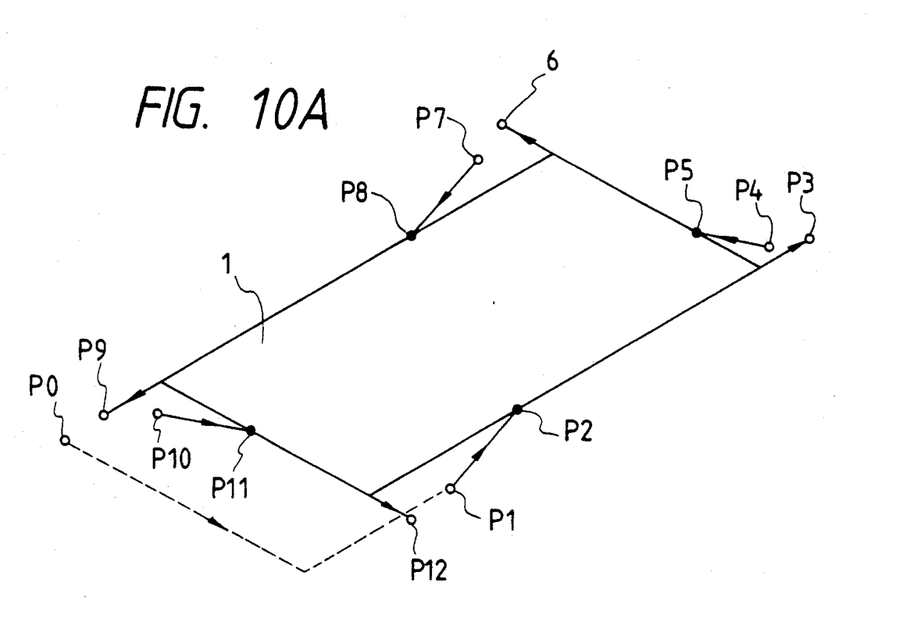
FIG. 10A and 10B are views to illustrate a method which is another embodiment of the present invention and in which thin continuous films are cut out by the device.

The actuators YM and XM are then driven so that the cutoff unit 71 is moved from an original position PO to a film cut-out start position (initially set position) P1 by the moving mechanism for the x-axis and y-axis positioning of the cutoff unit and stopped in the latter position, as shown in FIG. 10A. The cutoff unit 71 moved to the position P1 is vertically moved down by the pneumatic cylinder 64 so that the cutter 76a thrusts into a stratified film consisting of the conveyance film 2 and the dry film 3A. After that, the actuators YM and XM are rotated forward so that the cutoff unit 71 is moved to cause the cutter 76a to go to a position P2 while cutting the stratified film. When the actuators YM and XM are driven further so that the cutter 76a comes into contact with one edge of the base plate 1, the angle of tilt of the cutter 76a increases about the fulcrum P of the cutoff unit 71. The angle sensor 73 provided on the bracket 71b approaches the member 74 provided on the other bracket 71a, along with the increase in the angle of tilt of the cutter 76a. When the angle sensor 73 has then made a response, the drive of the actuator YM is stopped but that of the other actuator XM is still continued to move the cutoff unit 71 so that the cutter 76a is pushed on the edge of the base plate 1 by the weight of the cutoff unit 71 and moved to a position P3 while cutting the stratified film along the edge of the base plate. After that, the cutoff unit 71 is vertically moved up by the pneumatic cylinder 64 and then turned by an angle of 90 degrees by the cutoff unit rotation actuator 67. The cutoff unit 71 is then moved to a position P4.

The cutoff unit 71 is moved from the position P4 to a position P6 through a position P5 by the actuators YM and XM in the same manner as being moved from the position P1 to the position P3 through the position P2, so that the stratified film is cut by the cutter 76a along another edge of the base plate 1. The cutoff unit 71 is thereafter similarly moved from a position P7 to a position P9 through a position P8, and from a position P10 to a position P12 through a position P11, so that the stratified film is cut by the cutter 76a along the other edges of the base plate 1. The film is thus cut by the cutter 76a along all the edges of the base plate 1.

Figure 10B:
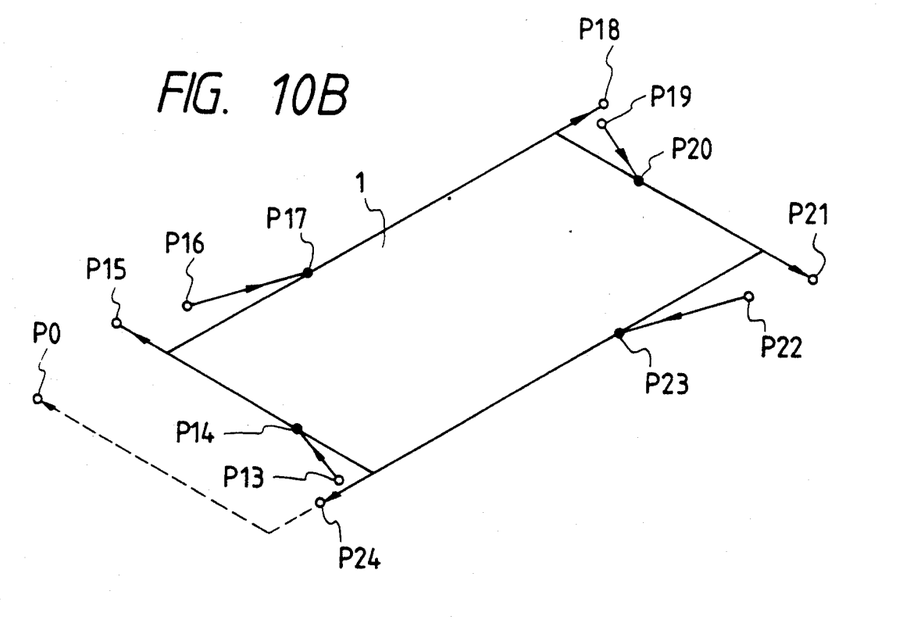

After that, the cutter holder 76 is turned by an angle of 180 degrees by the cutter holder rotation actuator 75, and the cutoff unit 71 is then moved, by the actuators YM and XM, in directions reverse to those of the preceding movement of the unit, namely, the unit is moved from a position P13 to a position P15 through a position P14, from a position P16 to a position P18 through a position P17, from a position P19 to a position P21 through a position P20, and from a position P22 to a position P24 through a position P23, as shown in FIG. 10B, so that the stratified film is cut again by the cutter 76a along all the edges of the base plate 1.

The cutoff unit 71 is then vertically moved up by the pneumatic cylinder 64. The cutter holder 76 is turned by an angle of 180 degrees by the cutter holder rotation actuator 75 so that the cutter 76a is reoriented in the original direction thereof. The cutoff unit 71 is thereafter returned to the original position PO thereof by the actuators YM and XM.

The cutter 76a is thus moved forth and back, from the optional positions distant from the edges of the base plate 1, to the farther ends of the edges, and along all the edges of the base plate, so that the stratified body 4 is cut out from the continuous conveyance film 2 and the continuous dry film 3A.

After that, the cut-out table 80 sucking the stratified body 4 thereon is moved down by the pneumatic cylinder 88 shown in FIGS. 4 and 5. The drive motor 92 is rotated to move the rotary belt 95 so that the cut-out table moving plate 86 secured to the belt is moved in the direction S to put the table under the base plate hold-down plate 127 of the pusher 120. The main portion 80a of the table 80 is moved up by the pneumatic cylinder 84 so that the stratified body 4 is placed at the bottom of the base plate hold-down plate 127. The drive motor 123 is rotated to move the rotary belt 125 so that the pusher moving plate 121 secured to the belt is moved. At that time, the jut 126a provided on the conveyance film recovery plate 126 at the end thereof comes as a push-out hook into contact with the base plate 1 so that the base plate is moved to the dust collector 130. Since the suction on the main portion 80a of the cut-out table 80 is kept in that case, only the base plate 1 and the dry film 3A stuck thereto under heat and pressure are moved to the dust collector 130 but the conveyance film 2 under the base plate is left on the main portion of the table.

During the movement of the pusher 120, the brush roller 132 is rotated by the drive motor 131 to remove the dust, the chip or the like from the bottom of the base plate and send out the dust, the chip or the like through the suction duct 133. When the pusher 120 is moved to a prescribed position, the conveyance film recovery plate 126 is located over the main portion 80a of the cut-out table 80. At that time, the vacuum suction on the main portion 80a of the table 80 is cased, and a vacuum suction mechanism provided at the recovery plate 126 and having a plurality of suction holes is put into vacuum sucking action so that the conveyance film 2 is transferred from the main portion of the table to the bottom of the recovery plate 126.

The pneumatic cylinder 84, the drive motor 92 and the pneumatic cylinder 88 are thereafter sequentially put into action so that the cut-out table 80 is returned to the original position thereof. The pusher 120 is then moved back to the original position thereof by the drive motor 123. During that movement, the vacuum suction mechanism at the conveyance film recovery plate 126 is put out of the vacuum sucking action so that the conveyance film 2 drop down from the plate into a recovery box provided thereunder and not shown in the drawings.

As described above, the film cut-out device 15 functions so that the cutter 76a is initially set in the position P1 between both the ends of and offset from one edge of the base plate 1 put on the thin continuous conveyance film 2 and stuck with the thin continuous dry film 3A on the main surface of the base plate, and is then moved from the position to the position P2 o so as to come into contact with the edge of the base plate, moved from the position P2 to the position P3 along the edge of the base plate, and similarly moved from the position P4 to the position P6 through the position P5, from the position P7 to the position P9 through the position P8, and from the position P10 to the position P12 through the position P11, a long the other edges of the base plate, and the cutter is thereafter moved in the reverse directions from the position P13 to the position P15 through the position P14, from the position P16 to the position P18 through the position P17, from the position P19 to the position P21 through the position P20 and from the position P22 to the position P24 through the position P23, along all the edges of the base plate, thus automatically cutting out the conveyance film and the dry film along the contour of the base plate. Beside, the film cut-out device 15 includes the cut-out table 80 on which the base plate 1 put on the thin continuous conveyance film 2 and stuck with the thin continuous dry film 3A on the main surface of the base plate is removably held; a means for initially setting the cutter 76a in the position P1 between both the ends of and offset from one edge of the base plate, moving the cutter from the position to the position P2 to put the cutter into contact with the edge, and moving the cutter from the position P2 to the position P3 along the edge; a means for moving the cutter from the position P4 to the position P6 through the position P5, from the position P7 to the position P9 through the position P8, and from the position P10 to the position P12 through the position P11, along the other edges of the base plate; and a means for moving the cutter in reverse from the position P13 to the position P15 through the position P14, from the position P16 to the position P18 through the position P17, from the position P19 to the position P21 through the position P20, and from the position P22 to the position P24 through the position P23, along all the edges of the base plate. Since the thin conveyance film 2 and the thin dry film 3A are not cut inward from the side edges thereof but cut out inside the side edges by the cutter, the films can be automatically and efficiently cut out along the contour of the base plate 1 put on the continuous conveyance film and stuck with the continuous dry film on the main surface of the base plate. For that reason, the productivity for the cut-out stratified body 4 can be made high. Besides, the conveyance film 2 and the dry film 3A which are left as wastes after the cutting-out can be automatically recovered.

The present invention is not confined to the embodiments described above, but may be embodied or practiced in other various ways without departing from the spirit or essential character of the invention.

Namely, it is possible to modify the invention as follows:

(1) It is possible to equally apply the invention to a base plate whose one-side principal surface is only covered by the film.

(2) It is also possible to apply the invention to the base plate, mentioned in the above paragraph (1), which is fixedly supported onto the cut-out table through the film.

(3) It is possible to apply the invention to a piece of cut film which is larger in size than the base plate, rather than the continuous film.

(4) Instead of the starting point for cutting the film at a position in contact with the base plate, it is possible to use a starting point for cutting the film at a position away from a contour of the base plate in parallel to each side edge of the base plate.

(5) Although, in FIGS. 10A and 10B, the parallel cutting start positions in the opposite directions with respect to each side edge by the cutter are separated away from each other, it is possible to equally apply the invention so that the parallel cutting start positions in the opposite directions are identical with each other.

(6) It is also possible to modify the invention so that the parallel cutting start positions in the opposite directions with respect to each side edge of the base plate are also set positions of the cutter for the film.

(7) The above-described features may be used in combination in any manner.

According to the present invention, a desirable effect is produced as mentioned from now on. A thin continuous film for conveying a base plate put on the film and another thin continuous film stuck to the main surface of the plate can be automatically and efficiency cut out along the contour of the plate so that the productivity for the assembly of the base plate and the films cut out along the contour of the plate is made high.

What is claimed is:

1. A method in which a first thin continuous film for conveying a base plate put on said first film and a second thin continuous film stuck to a main surface of said plate are automatically cut out along the contour of said plate, comprising the steps of:

moving a cutter to one end of an edge of said plate from an optional position distant from said edge and thereafter moving to the other end of said edge from another optional position distant from said edge; and performing said movement of said cutter with regard to all edges of said plate sequentially.

2. A method according to claim 1, further comprising the steps of:

setting initially said cutter in one of the optional positions between both the ends of and offset from one edge of said base plate;

moving said cutter from said position to said edge so as to come into contact therewith, and then moving said cutter along said edge;

performing the initial setting and movement of said cutter with regard to all edges of said plate sequentially in first directions; and moving said cutter in such a manner that said cutter is thereafter subjected to similar initial setting and movement with regard to all said edges sequentially in directions reverse to the movement in the first directions.

3. A method in which a thin film stuck to a main surface of a base plate and having a larger size than that of said plate is automatically cut out along the contour of said plate, comprising the steps of:

moving a cutter to one end of an edge of said plate from an optional position distant from said edge and thereafter moving to the other end of said edge from another optional position distant from said edge; and performing said movement of said cutter with regard to all edges of said plate sequentially.

4. A method in which a thin film stuck to a main surface of a base plate and having a larger size than that of said plate is automatically cut out along the contour of said plate, comprising the steps of:

moving a cutter to one end of an edge of said plate from an optional position distant from said edge and thereafter moving to the other end of said edge from said optional position distant from said edge; and performing said movement of said cutter with regard to all edges of said plate sequentially.

5. A device by which a first thin continuous film for conveying a base plate put on said first film and a second thin continuous film stuck to a main surface of said plate are cut out along the contour of said plate, comprising:

a cut-out table on which said plate put on the first film and stuck with the second film is removably placed;

means for initially setting a cutter in a position between both the ends of and offset from one edge of said plate, moving said cutter from said position to said edge to put said cutter into contact therewith, and moving said cutter along said edge;

means for performing the movement of said cutter along all the edges of said plate sequentially in first directions; and means for moving said cutter along all said edges in directions reverse to the movement of said cutter in the first directions.

6. A device according to claim 5, wherein said cut-out table has a groove having a form corresponding to the contour of said base plate, and is provided with means for sucking said plate on said table.

7. A device according to any of claims 5 and 6, wherein means for moving said cutter along the contour of said base plate are made of a moving mechanism for positioning said cutter along an x-axis and a y-axis.

8. A device by which a thin film stuck to a main surface of a base plate and having a larger size than that of said plate is cut out along the contour of said plate, comprising:

a cut-out table on which said plate with said film is removably placed;

means for initially setting a cutter in an optional position distant from one edge of said plate, moving said cutter from said position to one end of said one edge of said plate along said one edge;

means for performing the movement of said cutter along all the edges of said plate sequentially in first directions; and means for moving said cutter along all said edges in directions reverse to the movement of said cutter in the first directions.

9. A device according to claim 8, wherein said film is a thin continuous film.

* * * * *